March 17, 1953  E. W. WORK  2,631,412

PRESSURE REDUCING VALVE

Filed Feb. 12, 1949

INVENTOR.
ERICH W. WORK
BY
H. G. Manning
ATTORNEY

Patented Mar. 17, 1953

2,631,412

UNITED STATES PATENT OFFICE 2,631,412

PRESSURE REDUCING VALVE

Erich W. Work, Hartford, Conn., assignor to The Beaton & Cadwell Manufacturing Co., New Britain, Conn., a corporation of Connecticut Application February 12, 1949, Serial No. 76,060

1 Claim. (Cl. 50—23)

This invention relates to fluid pressure reducing valves, and more particularly to a valve for automatically regulating a flow of fluid from a high pressure supply line into a low pressure line so as to maintain a constant pressure in the low pressure line.

One object of this invention is to provide a valve of the above nature which will be governed entirely by the fluid pressure existing in the low pressure line.

Another object is to provide a valve of the above nature which has a bellows for protecting the valve member against any direct influence from the high pressure line.

Another object is to provide a valve of the above nature which avoids the use of mechanical linkages, which has only a few moving parts, and which may be easily taken apart for inspection or repair.

A further object is to provide a reducing valve of the above nature, which will be simple in construction, inexpensive to manufacture, easy to install and maintain, compact, and very efficient and durable in use.

With these and other objects in view, there has been illustrated on the accompanying drawing one form in which the invention may be conveniently embodied in practice.

Figure 1:
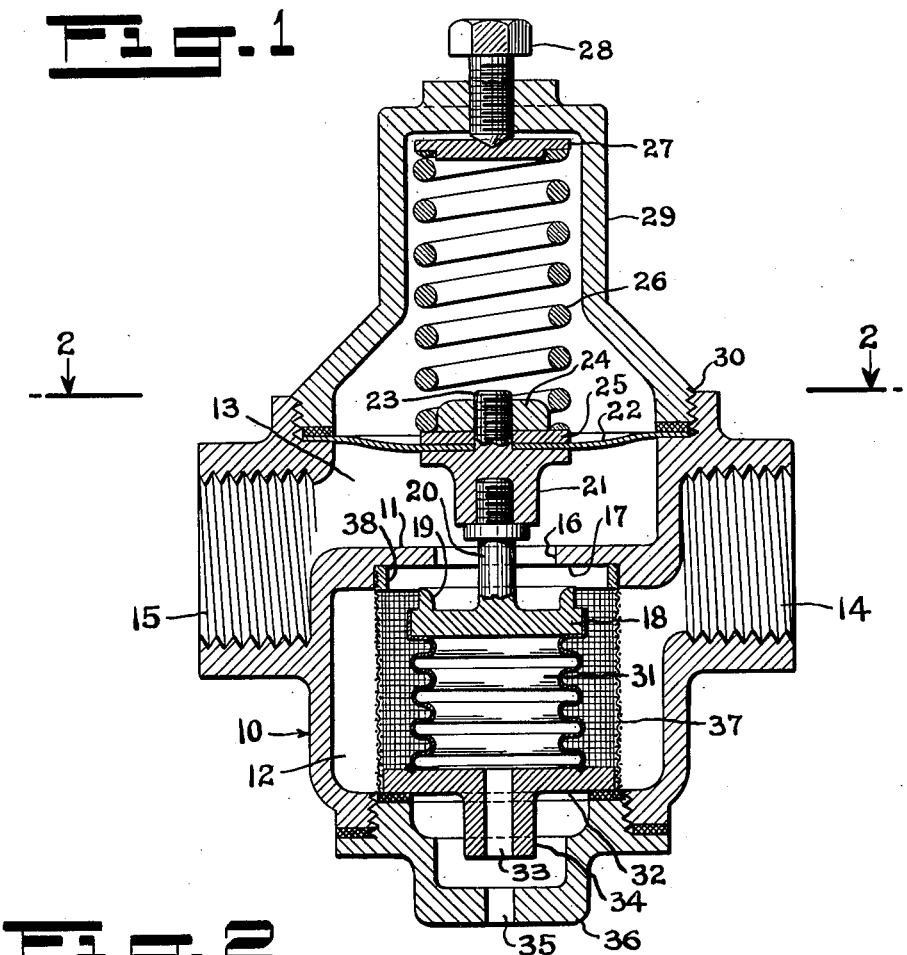
Fig. 1 is a longitudinal sectional view of the improved pressure reducing valve.
Figure 2:
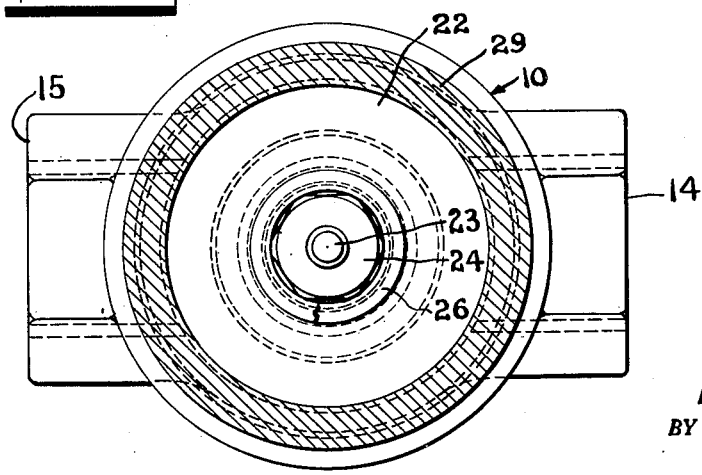
Fig. 2 is a cross-sectional view, taken on the line 2—2 of Fig. 1, looking downwardly.

Referring now to the drawing in which like reference numerals denote corresponding parts throughout the several views, the numeral 10 indicates an open-ended housing having a transverse horizontal partition 11 which divides the interior of said housing into a high pressure lower chamber 12, and a low pressure upper chamber 13—said chambers being provided respectively with a threaded inlet 14, and a threaded outlet 15.

A circular opening 16 is formed in the central portion of the transverse partition 11 in order to permit fluid communication between the high pressure chamber 12 and the low pressure chamber 13.

The lower side of the partition 11 adjacent the opening 16 is smoothly machined so as to provide a flat annular surface 17, which is adapted to serve as a seat for a valve disk 18 having a circular upstanding flange 19. The upstanding flange 19 is of a suitable diameter to engage the annular surface 17 outwardly of the opening 16 and is rounded upon the upper portion of its inner surface in order to afford a close control of the fluid when said flange 19 approaches its closed position against the annular surface 17.

The valve disk 18 is provided with an integral stem 20 having a threaded upper end which extends upwardly through the opening 16, and is screwed into the lower end of a connecting member 21 which is disposed at the lower side of a flexible diaphragm 22. The diaphragm 22 serves as the upper wall of the low pressure chamber 13 and its central portion is tightly clamped between the connecting member 21 and an upper washer 25 by means of a nut 24 which is engaged upon a reduced upper end 23 of the connecting member 21.

The valve disk 18 is urged downwardly into open position by means of a coiled spring 26 which is engaged between the washer 25 and a circular spring base 27. The spring base 27 is held by an adjusting screw 28 in the upper end of a spring housing 29, whereby the force of the spring 26 may be adjusted in order to regulate the effect of the fluid pressure in the chamber 13 upon the flexible diaphragm 22.

The spring housing 29 is secured to the upper threaded end of the housing 10 by means of a threaded lower end 30, which serves also to clamp the periphery of the diaphragm 22 tightly in position.

The valve member 18 is protected against the effect of high pressure in the chamber 12 by means of a generally cylindrical flexible bellows 31, having its respective upper and lower ends sealed to the periphery of the valve member 18 and to the upper surface of a supporting disk 32 by any suitable means, such as solder.

The bellows 31 is so proportioned as to have an effective cross-sectional area which is equal to the area within the valve flange 19, so that variations in pressure in the lower chamber 12 can have no effect upon the operation of the valve.

The interior of the bellows 31 is maintained in communication with the atmosphere through an aperture 33 in a downwardly-extending nipple 34 on the supporting disk 32, and an aperture 35 in a hollow plug 36 which serves as a closure for the lower end of the housing 10.

It will be noted that the supporting disk 32 has a diameter which is considerably greater than the diameter of the bellows 31, so that fluid pressure in the lower chamber 12 will hold said supporting disk firmly seated upon said closure plug 36, thus preventing any leakage of fluid from the chamber 12 into the interior of the plug 36 and outwardly through the aperture 35.

It will also be noted that the bottom opening of the housing 10, into which the closure plug 36 is threaded, is of ample size to permit the removal of the supporting disk 32 therethrough. Thus, the supporting disk 32, the bellows 31, and the valve member 18 form a unit which may be easily disconnected and removed from the housing 10 merely by unscrewing the closure plug 36 and then unscrewing the valve stem 20 from the clamping member 21 by turning the downwardly-extending nipple 34.

The relief valve may be protected against the possibility of adverse effects due to foreign matter in the fluid by means of a cylindrical screen 37 which is adapted to enclose the valve disk 18 and the bellows 31. The upper end of the screen may be provided with a reinforcing ring 38 which is adapted to abut the annular surface 17 outwardly of the valve member 18.

The lower end of the screen 37 is secured to the periphery of the supporting disk 32 by means of solder, so that said screen may be removed from the housing 10 along with said disk 32.

Operation

In operation, the threaded inlet 14 will be attached to a high pressure fluid supply line, and the threaded outlet 15 will be attached to a line which is to be supplied with fluid at a relatively low pressure.

High pressure fluid may then be admitted to the lower chamber 12, whereupon said fluid will pass around the valve disk 18 into the upper low pressure chamber 13. The spring-pressed diaphragm 22 will respond to rising fluid pressure in the chamber 13 by moving the valve disk 18 upwardly so as to restrict the flow of fluid through the opening 16, and thus will maintain the desired low pressure in the upper chamber 13 and in the low pressure line attached to the outlet 15.

If the pressure in the upper chamber 13 should tend to drop, the balancing force of the spring 26 will, of course, result in a corresponding opening movement of the valve disk 18.

Thus, the valve disk 18 will be controlled solely by the force of the low pressure fluid against the diaphragm 22 so as to result in a very even pressure regulation which will not be disturbed by fluctuations in the high pressure fluid, since the valve disk 18 is completely shielded against any adverse effects from the high pressure fluid.

The degree of pressure to be maintained in the low pressure chamber 13 will be determined by the adjustment of the screw 28, which may be turned so as to vary the degree of fluid pressure which is necessary to operate the valve disk 18.

While there has been disclosed in this specification, one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claim.

Having thus fully described the invention, what is claimed as new, and for which it is desired to secure Letters Patent, is:

In a pressure reducing balanced valve for automatically regulating the flow of fluid from a high pressure supply line into a low pressure line which will be governed entirely by the fluid in the low pressure line, a housing having high and low pressure chambers separated by a flat partition having a central opening, a valve disk in said high pressure chamber having an upstanding flange, the inner and outer sides of which are perpendicular to said partition and provided with a convex curved upper edge adapted to lie below and adjacent the flat partition outside of said central opening, said convex edge being downwardly convergent on its inner side for a substantial portion of its length, and having a shorter divergent section on its outer side and serving to maintain a smooth non-turbulent flow of fluid from said high pressure chamber to said low pressure chamber, said high pressure chamber having an open bottom communicating with the outer atmosphere, an apertured plate releasably held seated on said open bottom by the fluid in said high pressure chamber, a flexible bellows connecting said valve disk to said plate, a spring-pressed flexible diaphragm in the top of said low pressure chamber and having its center connected rigidly by a stem to said valve disk, whereby a decrease of the fluid pressure in said low pressure line will cause said valve disk to be moved downwardly away from said partition to automatically increase the rate of flow of fluid from said high pressure chamber to said low pressure chamber.

ERICH W. WORK.

REFERENCES CITED

The following references are of record in the file of this patent:

UNITED STATES PATENTS

| Number | Name | Date |
| --- | --- | --- |
| 374,485 | McGann | Dec. 6, 1887 |
| 853,503 | Eddy | May 14, 1907 |
| 1,576,686 | Terry | Mar. 16, 1926 |
| 1,903,248 | Spence | Mar. 28, 1933 |
| 1,937,565 | Griffiths | Dec. 5, 1933 |
| 1,950,121 | McKee | Mar. 6, 1934 |
| 2,091,051 | Mesinger | Aug. 24, 1937 |
| 2,301,031 | Ferguson | Nov. 3, 1942 |
| 2,318,721 | Siner | May 11, 1943 |
| 2,487,089 | Anthes | Nov. 8, 1949 |